(12) United States Patent
Ianculescu et al.

(10) Patent No.: US 8,422,739 B2
(45) Date of Patent: *Apr. 16, 2013

(54) REAL-TIME FACE TRACKING IN A DIGITAL IMAGE ACQUISITION DEVICE

(75) Inventors: Mihai Ianculescu, Bucuresti (RO); Petronel Bigioi, Galway (IE); Mihnea Gangea, Bucuresti (RO); Stefan Petrescu, Bucuresti (RO); Peter Corcoran, Claregalway (IE); Eran Steinberg, San Francisco, CA (US)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,149

(22) Filed: Sep. 15, 2011

(65) Prior Publication Data

US 2012/0062761 A1    Mar. 15, 2012

Related U.S. Application Data

(63) Continuation of application No. 12/167,500, filed on Jul. 3, 2008, now Pat. No. 8,050,465, which is a continuation of application No. 11/753,397, filed on May 24, 2007, now Pat. No. 7,403,643, which is a continuation-in-part of application No. 11/464,083, filed on Aug. 11, 2006, now Pat. No. 7,315, 631.

(60) Provisional application No. 60/829,127, filed on Oct. 11, 2006.

(51) Int. Cl.
*G06K 9/00* (2006.01)
*H04N 5/228* (2006.01)
*G06K 9/34* (2006.01)

(52) U.S. Cl.
USPC .................................... 382/103; 348/222.1

(58) Field of Classification Search .................. 382/103, 382/115, 117, 118, 164, 173, 181, 190, 218, 382/224, 254, 284, 298, 299, 305; 348/222.1, 348/E05.031; 358/538
See application file for complete search history.

(56) References Cited

U.S. PATENT DOCUMENTS 4,448,510 A    5/1984 Murakoshi
4,975,969 A    12/1990 Tal
(Continued)

FOREIGN PATENT DOCUMENTS

EP    0578508 A2    1/1994
EP    0984386 A2    3/2000
(Continued)

OTHER PUBLICATIONS

Notification of Transmittal of the International Search Report and the Written Opinion of the International Searching Authority, or the Declaration, for PCT Application No. PCT/US2006/032959, filed Aug. 22, 2006, paper dated Sep. 8, 2007, 8 pages.

(Continued)

*Primary Examiner* — Amir Alavi
(74) *Attorney, Agent, or Firm* — Andrew V. Smith (57) ABSTRACT

A database includes an identifier and associated parameters for each of a number of faces to be recognized. A new acquired image from an image stream is received potentially including one or more face regions. Face detection is applied to at least a portion of the acquired image to provide a set of candidate face regions each having a given size and a respective location. Using the database, face recognition is selectively applied to at least one of the candidate face regions to provide an identifier for a face recognized in a candidate face region. A portion of the image is stored including the recognized face in association with at least one image of the image stream.

18 Claims, 4 Drawing Sheets

U.S. PATENT DOCUMENTS

| | | | |
|---|---|---|---|
| 5,008,946 A | 4/1991 | Ando | |
| 5,161,204 A | 11/1992 | Hutcheson et al. | |
| 5,280,530 A | 1/1994 | Trew et al. | |
| 5,331,544 A | 7/1994 | Lu et al. | |
| 5,465,308 A | 11/1995 | Hutcheson et al. | |
| 5,715,325 A | 2/1998 | Bang et al. | |
| 5,771,307 A | 6/1998 | Lu et al. | |
| 5,774,591 A | 6/1998 | Black et al. | |
| 5,850,470 A | 12/1998 | Kung et al. | |
| 5,905,807 A | 5/1999 | Kado et al. | |
| 5,912,980 A | 6/1999 | Hunke | |
| 6,108,437 A | 8/2000 | Lin | |
| 6,115,052 A | 9/2000 | Freeman et al. | |
| 6,128,398 A | 10/2000 | Kuperstein et al. | |
| 6,173,068 B1 | 1/2001 | Prokoski | |
| 6,188,777 B1 | 2/2001 | Darrell et al. | |
| 6,292,575 B1 | 9/2001 | Bortolussi et al. | |
| 6,301,370 B1 | 10/2001 | Steffens et al. | |
| 6,407,777 B1 | 6/2002 | DeLuca | |
| 6,445,810 B2 | 9/2002 | Darrell et al. | |
| 6,463,163 B1 | 10/2002 | Kresch | |
| 6,526,156 B1 | 2/2003 | Black et al. | |
| 6,529,630 B1 | 3/2003 | Kinjo | |
| 6,549,641 B2 | 4/2003 | Ishikawa et al. | |
| 6,633,655 B1 | 10/2003 | Hong et al. | |
| 6,661,907 B2 | 12/2003 | Ho et al. | |
| 6,747,690 B2 | 6/2004 | Mølgaard | |
| 6,959,109 B2 | 10/2005 | Moustafa | |
| 7,027,621 B1 | 4/2006 | Prokoski | |
| 7,042,505 B1 | 5/2006 | De Luca | |
| 7,043,056 B2 | 5/2006 | Edwards et al. | |
| 7,043,465 B2 | 5/2006 | Pirim | |
| 7,082,212 B2 | 7/2006 | Liu et al. | |
| 7,120,279 B2 | 10/2006 | Chen et al. | |
| 4,472,781 A1 | 1/2008 | Corcoran et al. | |
| 7,315,631 B1* | 1/2008 | Corcoran et al. | 382/118 |
| 7,403,643 B2* | 7/2008 | Ianculescu et al. | 382/118 |
| 7,460,694 B2* | 12/2008 | Corcoran et al. | 382/118 |
| 7,460,695 B2* | 12/2008 | Steinberg et al. | 382/118 |
| 7,469,055 B2* | 12/2008 | Corcoran et al. | 382/118 |
| 7,620,218 B2* | 11/2009 | Steinberg et al. | 382/118 |
| 7,693,310 B2 | 4/2010 | Kato et al. | |
| 7,697,726 B2 | 4/2010 | Mansfield et al. | |
| 7,864,990 B2* | 1/2011 | Corcoran et al. | 382/118 |
| 7,916,897 B2* | 3/2011 | Corcoran et al. | 382/103 |
| 7,961,947 B2 | 6/2011 | Gordon et al. | |
| 8,050,465 B2* | 11/2011 | Ianculescu et al. | 382/118 |
| 8,055,029 B2 | 11/2011 | Petrescu et al. | |
| 8,254,752 B2* | 8/2012 | Ryu | 386/241 |
| 8,270,674 B2* | 9/2012 | Corcoran et al. | 382/103 |
| 2002/0102024 A1 | 8/2002 | Jones et al. | |
| 2002/0141640 A1 | 10/2002 | Kraft | |
| 2003/0133600 A1 | 7/2003 | Huang et al. | |
| 2003/0169907 A1 | 9/2003 | Edwards et al. | |
| 2004/0041121 A1 | 3/2004 | Yoshida et al. | |
| 2004/0175021 A1 | 9/2004 | Porter et al. | |
| 2004/0223063 A1 | 11/2004 | DeLuca et al. | |
| 2004/0228505 A1 | 11/2004 | Sugimoto | |
| 2004/0264744 A1 | 12/2004 | Zhang et al. | |
| 2005/0013479 A1 | 1/2005 | Xiao et al. | |
| 2005/0018923 A1 | 1/2005 | Messina et al. | |
| 2005/0031224 A1 | 2/2005 | Prilutsky et al. | |
| 2005/0062849 A1 | 3/2005 | Foth et al. | |
| 2005/0140801 A1 | 6/2005 | Prilutsky et al. | |
| 2005/0147278 A1 | 7/2005 | Rui et al. | |
| 2006/0029265 A1 | 2/2006 | Kim et al. | |
| 2006/0050933 A1 | 3/2006 | Adam et al. | |
| 2006/0098875 A1 | 5/2006 | Sugimoto | |
| 2006/0133699 A1 | 6/2006 | Widrow et al. | |
| 2006/0187305 A1 | 8/2006 | Trivedi et al. | |
| 2006/0204034 A1 | 9/2006 | Steinberg et al. | |
| 2006/0204055 A1 | 9/2006 | Steinberg et al. | |
| 2006/0204056 A1 | 9/2006 | Steinberg et al. | |
| 2006/0227997 A1 | 10/2006 | Au et al. | |
| 2007/0110305 A1 | 5/2007 | Corcoran et al. | |
| 2007/0160307 A1 | 7/2007 | Steinberg et al. | |
| 2007/0201725 A1 | 8/2007 | Steinberg et al. | |
| 2007/0201726 A1 | 8/2007 | Steinberg et al. | |
| 2007/0273504 A1 | 11/2007 | Tran | |
| 2008/0013799 A1 | 1/2008 | Steinberg et al. | |
| 2008/0013800 A1 | 1/2008 | Steinberg et al. | |
| 2008/0037827 A1 | 2/2008 | Corcoran et al. | |
| 2008/0037838 A1 | 2/2008 | Ianculescu et al. | |
| 2008/0037840 A1 | 2/2008 | Steinberg et al. | |
| 2008/0080744 A1 | 4/2008 | Tanaka | |
| 2008/0219517 A1* | 9/2008 | Blonk et al. | 382/118 |
| 2008/0267461 A1 | 10/2008 | Ianculescu et al. | |
| 2009/0116815 A1 | 5/2009 | Ryu | |
| 2010/0060727 A1 | 3/2010 | Steinberg et al. | |
| 2011/0026780 A1 | 2/2011 | Corcoran et al. | |
| 2011/0129121 A1 | 6/2011 | Corcoran et al. | |
| 2011/0141219 A1 | 6/2011 | Yeh | |
| 2012/0062761 A1* | 3/2012 | Ianculescu et al. | 348/222.1 |
| 2012/0070087 A1 | 3/2012 | Petrescu et al. | |

FOREIGN PATENT DOCUMENTS

| | | |
|---|---|---|
| EP | 1391842 A2 | 2/2004 |
| EP | 1398733 A1 | 3/2004 |
| EP | 2052349 B1 | 10/2009 |
| EP | 2256666 A2 | 12/2010 |
| EP | 2052347 B1 | 4/2011 |
| EP | 2256666 A3 | 11/2011 |
| JP | 06-030318 A | 2/1994 |
| JP | 2000-354247 A | 12/2000 |
| JP | 2005-302056 A | 10/2005 |
| JP | 2006-087083 A | 3/2006 |
| JP | 2006-129271 A | 5/2006 |
| JP | 2009-258770 A | 11/2009 |
| WO | 01/33497 A1 | 5/2001 |
| WO | 03/028377 A1 | 4/2003 |
| WO | 2006/030519 A1 | 3/2006 |
| WO | 2008/017343 A1 | 2/2008 |
| WO | 2008/018887 A1 | 2/2008 |

OTHER PUBLICATIONS

Crowley, J., and Berard, F., Multi-modal tracking for video communication, In Computer Vision and Patent Recognition, 1997. http://citeseer.ist.psu.edu/crowley97multimodal.html.

Deng, Ya-Feng; Su, Guang-Da; Zhou, Jun; Fu, Bo, Fast and Robust face detection in video, Conference: International Conference on Machine Learning and Cybernetics, ICMLC 2005, Guangzhou, China , 20050818-20050821. http://rlinks2.dialog.com/NASApp/ChannelWEB/DialogProServlet?ChName=engineering.

Gangaputra, Sachin; Donald Geman, A Unified Stochastic Model for Detecting and Tracking Faces, Proceedings of the the 2nd Canadian Conference on Computer and Robot Vision (CRV 2005), vol. 00, pp. 306 313, ISBN:0-7695-2319-6, Publisher: IEEE Computer Society, Washington, DC, USA. http://portal.acm.org/citation.cfm?id=1068818&coll=GUIDE&dl=GUIDE&CFID=6809268&CFTOKEN=82843223.

Isukapalli, Ramana; Elgammal, Ahmed; Greiner, Russell , Learning a dynamic classification method to detect faces and identify facial expression, 2nd International Workshop on Analysis and Modelling of Faces and Gestures, AMFG 2005, In Lecture Notes in Computer Science (including sub-series Lecture Notes in Artificial Intelligence and Lecture Notes in Bioinformatics) v 3723 LNCS 2005., 2005 http://rlinks2.dialog.com/NASApp/ChannelWEB/DialogProServlet?ChName=engineering.

M Isukapalli, Ramana; Elgammal, Ahmed; Greiner, Russell , Learning a dynamic classification method to detect faces and identify facial expression, 2nd International Workshop on Analysis and Modelling of Faces and Gestures, AMFG 2005, in Lecture Notes in Computer Science (including sub-series Lecture Notes in Artificial Intelligence and Lecture Notes in Bioinformatics) v 3723 LNCS 2005.,2005 http://rlinks2.dialog.com/NASApp/ChannelWEB/DialogProServlet?ChName=engineering.

Moghaddam, Baback; Tony Jebara; Alex Pentland, Bayesian Modeling of Facial Similarity, Advances in Neural Information Processing Systems (NIPS 1998), pp. 910-916. http://citeseer.ist.psu.edu/article/moghaddam98bayesian.html.

Song, Hong; Shi, Feng, Face detection and segmentation for video surveillance, Binggong Xuebao/Acta Armamentarii v 27 n 2 Mar. 2006. p. 252-257, 2006, Language: Chinese. http://rlinks2.dialog.com/NASApp/ChannelWEB/DialogProServlet?ChName=engineering.

Turkan, Mehmet; Dulek, Berkan; Onaran, Ibrahim; Cetin, A. Enis, Human face detection in video using edge projections, Conference: Visual Information Processing XV, Kissimmee, FL, United States, 20060418-20060419, (Sponsor: SPIE) Proceedings of SPIE—The International Society for Optical Engineering Visual Information Processing XV v 6246 2006. http://rlinks2.dialog.com/NASApp/ChannelWEB/DialogProServlet?ChName=engineering.

Yang, Ming-Hsuan; David J. Kriegman; Narendra Ahuja, Detecting Faces in Images: A Survey, IEEE Transactions on Pattern Analysis and Machine Intelligence archive, vol. 24, Issue 1 (Jan. 2002), pp. 34 58, ISSN:0162-8828, Publisher: IEEE Computer Society, Washington, DC, USA. http://portal.acm.org/citation.cfm?id=505621&coll=GUIDE&dl=GUIDE&CFID=6809268&CFTOKEN=82843223.

Zhao, W; R. Chellappa; P. J. Phillips A. Rosenfeld, Face recognition: A literature survey, ACM Computing Surveys (CSUR) archive, vol. 35, Issue 4 (Dec. 2003) table of contents, pp. 399 458; ISSN: 0360-0300, Authors, Publisher: ACM Press, New York, NY, USA. http://portal.acm.org/citation.cfm?id=954342&coll=GUIDE&dl=GUIDE&CFID=6809268&CFTOKEN=82843223.

Huang, J. And Gutta, S., et al., 2nd International Conference on Automatic Face and Gesture Recognition (FG '96). p. 248 Detection of human faces using decision trees, IEEE Xplore http://doi.ieeecomputersociety.org/10.1109/AFGR.1996.557272.

Lai, J. H., Yuen, P.C., and Feng, G. C. , Face recognition using holistic Fourier invariant features, Pattern Recognition, 34 (2001), pp. 95-109. http://digitalimaging.inf.brad.ac.uk/publication/pr34-1.pdf.

Jones, M and Viola, P., Fast multi-view face detection, Mitsubishi Electric Research Lab, 2003. http://www.merl.com/papers/docs/TR2003-96.pdf.

Rowley, H.A., Baluja, S. Kanade, T. , Neural network-based face detection, IEEE Transactions on Pattern Analysis and Machine Intelligence, Jan. 1998, vol. 20, Issue: 1, pp. 23-38, ISSN: 0162-8828, DOI: 10.1109/34.655647, Posted online: Aug. 6, 2002. http://ieeexploreieee.org/xpl/freeabs_all.jsp?arnumber=655647&isnumber=14286.

Notification of Transmittal of the International Search Report and the Written Opinion of the International Searching Authority, or the Declaration, for PCT Application No. PCT/EP2007/005330, filed Jun. 18, 2007, paper dated Sep. 28, 2007, 11 pages.

Nayak et al., Automatic illumination correction for scene enhancement and objection tracking, Image and Vision Computing, Guildford, GB, vol. 24, No. 9, Sep. 2006, pp. 949-959, XP005600656, ISSN: 0262-8856.

Non-Final Rejection, dated Jan. 23, 2013, for U.S. Appl. No. 13/245,738, filed Sep. 26, 2011.

Peter W. Rander: Real-Time Image-Based Face Tracking. Retrieved from http://www.ece.emu.edu/research/publications/1993. 1993.

Non-Final Rejection, dated May 11, 2012, for U.S. Appl. No. 12/983,863, filed Jan. 3, 2011.

Communication regarding the transmission of the European search report, European search opinion, European search report, dated Oct. 17, 2011, for European patent application No. 10163739.5, (EP2256666 ), 9 pages.

M. Castrillon-Santana et al.: "Multiple face detection at different resolutions for perceptual user interfaces" Lecture Notes in Computer Science, [Online] vol. 3522, May 13, 2005, pp. 445-452, XP002562025 Retrieved from the Internet: URL:http://www.springerlink.com/content/m5umr32q91673xhf/> [retrieved on Jan. 6, 2010], DOI:http://dx.doi.org/10.1007/11492429_54.

S. Kawato et al.: "Scale-adaptive face detection and tracking in real-time with SSR filters and Support Vector Machine" IEICE Trans. on Information and Systems, [Online] vol. E88-D, No. 12, pp. 2857-2863, XP008116751 Retrieved from the Internet: URL:http://search.ieice.org/bin/summary.php?id=e88-d_12_2857&category=D&lang=E&year=2005&abst=&auth=1> [retrieved on Jan. 6, 2010], DOI. http://dx.doi.org/10.1093/ietisy/e88-d.12.2857.

M.-T. Pham et al.: "Detection Caching for Faster Object Detection" Proc. IEEE Workshop on Modeling People and Human Interaction, [Online] Oct. 15, 2005, pp. 1-8, XP002562026 Retrieved from the Internet: URL:http://web.mysites.ntu.edu.sg/astjcham/public/Shared%20Documents/papers/phamcham-phi05-hdr.pdf> [retrieved on Jan. 6, 2009].

Chang Huang et al.: "Learning Sparse Features in Granular Space for Multi-View Face Detection" Automatic Face and Gesture Recognition, 2006. FGR 2006. 7th International Conference on Southampton, UK Apr. 10-12, 2006, Piscataway, NJ, USA, IEEE, Apr. 10, 2006, pp. 401-407, XP010911641, ISBN: 978-0-7695-2503-7, DOI:http://dx.doi.org/10.1109/FGR.2006.70.

Zhang D D Ed—Zhang D D: "Automated Biometrics/7 Face Recognition", Jan. 1, 2000, Automated Biometrics: Technologies and Systems, Norwell, MA : Kluwer Academic Publ, US, pp. 137-1581-5, XP002485295, ISBN: 978-0-7923-7856-3.

PCT Notification of Transmittal of the International Search Report and the Written Opinion of the International Searching Authority, or the Declaration, for PCT Application No. PCT/EP2007/005330, report dated Sep. 28, 2007, 11 pages.

PCT International Preliminary Report on Patentability, Chapter II of the Patent Cooperation Treaty, for PCT Application No. PCT/EP2007/005330, report dated Feb. 11, 2009, 14 pages.

PCT Written Opinion of the International Search Authority, for PCT Application No. PCT/EP20071005330, report dated Feb. 11, 2009, 6 pages.

Nayak et al.: "Automatic illumination correction for scene enhancement and object tracking" Image and Vision Computing, Guildford, GB, vol. 24, No. 9, Sep. 2006, pp. 949-959, XP005600656 ISSN:0262-8856, DOI:http://dx.doi.org/10.1016/j.imavis.2006.02.017.

Chow G et al.: "Towards a System for Automatic Facial Feature Detection", Pattern Recognition, Elsevier, GB, vol. 26, No. 12, Dec. 1, 1993, pp. 1739-1755, XP000420368, ISSN: 0031-3203, DOI: DOI:10.1016/0031-3203(93)90173-T.

Patent Abstracts of Japan, publication No. 06-030318A (1994), publication date: Feb. 4, 1994, for Video Camera System.

Patent Abstracts of Japan, publication No. 2005-302056A, publication date: Oct. 27, 2005, for Pattern Extracting Apparatus.

Patent Abstracts of Japan, publication No. 2000-354247A, publication date: Dec. 19, 2000, for Image Processing Unit.

Patent Abstracts of Japan, publication No. 2006-087083A, publication date: Mar. 30, 2006, for Imaging Device, and Control Method of Imaging Device.

Patent Abstracts of Japan, publication No. 2006-129271A, publication date: May 18, 2006, for Camera, Image Processing Apparatus and Image Processing Method, and Image Processing Program.

Patent Abstracts of Japan, publication No. 2009-258770A, publication date: Nov. 6, 2009, for Image Processing Method, Image Processor, Image Processing Program, and Imaging Device.

* cited by examiner

REAL-TIME FACE TRACKING IN A DIGITAL IMAGE ACQUISITION DEVICE

PRIORITY

This application is a Continuation of U.S. patent application Ser. No. 12/167,500, filed Jul. 3, 2008, now U.S. Pat. No. 8,050,465; which is a Continuation of U.S. patent application Ser. No. 11/753,397, filed May 24, 2007, now U.S. Pat. No. 7,403,643; which is a Continuation-in-Part (CIP) of U.S. patent application Ser. No. 11/464,083, filed Aug. 11, 2006, now U.S. Pat. No. 7,315,631; and also claims the benefit of priority under 35 USC §119 to U.S. provisional patent application Ser. No. 60/829,127, filed Oct. 11, 2006.

BACKGROUND

1. Field of the Invention

The present invention provides an improved method and apparatus for image processing in acquisition devices. In particular the invention provides improved real-time face tracking in a digital image acquisition device.

2. Description of the Related Art

Face tracking for digital image acquisition devices includes methods of marking human faces in a series of images such as a video stream or a camera preview. Face tracking can be used to indicate to a photographer locations of faces in an image, thereby improving acquisition parameters, or allowing post processing of the images based on knowledge of the locations of the faces.

In general, face tracking systems employ two principle modules: (i) a detection module for locating new candidate face regions in an acquired image or a sequence of images; and (ii) a tracking module for confirming face regions.

A well-known fast-face detection algorithm is disclosed in US 2002/0102024, hereinafter Viola-Jones, which is hereby incorporated by reference. In brief, Viola-Jones first derives an integral image from an acquired image, which is usually an image frame in a video stream. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Also, intensities for adjacent sub-windows can be efficiently compared using particular combinations of integral image values from points of the sub-windows.

In Viola-Jones, a chain (cascade) of 32 classifiers based on rectangular (and increasingly refined) Haar features are used with the integral image by applying the classifiers to a sub-window within the integral image. For a complete analysis of an acquired image, this sub-window is shifted incrementally across the integral image until the entire image has been covered.

In addition to moving the sub-window across the entire integral image, the sub window is also scaled up/down to cover the possible range of face sizes. In Viola-Jones, a scaling factor of 1.25 is used and, typically, a range of about 10-12 different scales are used to cover the possible face sizes in an XVGA size image.

It will therefore be seen that the resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature. These generally employ rectangular, Haar feature classifiers and use the integral image techniques of Viola-Jones.

Even though Viola-Jones is significantly faster than previous face detectors, it still involves significant computation and a Pentium-class computer can only just about achieve real-time performance. In a resource-restricted embedded system, such as a hand held image acquisition device, e.g., a digital camera, a hand-held computer or a cellular phone equipped with a camera, it is generally not practical to run such a face detector at real-time frame rates for video. From tests within a typical digital camera, it is possible to achieve complete coverage of all 10-12 sub-window scales with a 3-4 classifier cascade. This allows some level of initial face detection to be achieved, but with undesirably high false positive rates.

In US 2005/0147278, by Rui et al., which is hereby incorporated by reference, a system is described for automatic detection and tracking of multiple individuals using multiple cues. Rui et al. disclose using Viola-Jones as a fast face detector. However, in order to avoid the processing overhead of Viola-Jones, Rui et al. instead disclose using an auto-initialization module which uses a combination of motion, audio and fast face detection to detect new faces in the frame of a video sequence. The remainder of the system employs well-known face tracking methods to follow existing or newly discovered candidate face regions from frame to frame. It is also noted that Rui et al. involves some video frames being dropped in order to run a complete face detection process.

SUMMARY OF THE INVENTION

A method of recognizing faces in an image stream is provided. A database includes an identifier and associated parameters for each of a number of one or more faces to be recognized. A new acquired image from an image stream is received. Face detection is applied to at least a portion of the acquired image to provide a set of one or more candidate face regions each having a given size and a respective location. Using the database, face recognition is selectively applied to at least one candidate face region to provide an identifier for a face recognized in the candidate face region. A portion of the image including the recognized face is stored in association with at least one image of the image stream.

The selective applying of face recognition may include selecting only one or more candidate face regions having a frontal alignment for face recognition. The method may further include selecting only one or more candidate face regions including two eye regions and a mouth region within a given area of the candidate face region.

The method may also include providing a level of confidence for each candidate face region based on the face detection. A candidate face region may be designated with a first level of confidence as a face region. Face recognition may only be applied to candidate face regions having a second confidence level higher than the first level of confidence.

The method may also include applying an Active Appearance Model (AAM) to each candidate face region, and applying face recognition only to one or more candidate face regions having AAM parameters indicating the candidate face region has a vertical and a horizontal rotation within a pre-determined range.

The face detection may include applying chain classifiers to the main image, wherein at least one of the classifiers includes a frontal classifier chain. Face recognition may be applied only to one or more candidate face regions detected with the frontal classifier chain.

The method may also include calculating an average luminance for each candidate face region. Face recognition may be applied only to one or more candidate face regions having average luminance within a pre-determined range.

The new acquired image may be a low resolution preview image. The portion of the image including a recognized face may be stored in association with a main high resolution image.

A further method is provided for tracking faces in an image stream. An acquired image is received from an image stream including one or more face regions. The acquired image is sub-sampled at a specified resolution. A corresponding integral image is calculated for a least a portion of the sub-sampled image. Face detection is applied to at least a portion of said integral image to provide a set of one or more candidate face regions each having a given size and a respective location. The set of candidate face regions is merged with one or more previously detected face regions to provide a set of candidate face regions of different sizes or locations or both.

Candidate face regions of different sizes may be tracked from multiple images of the image stream.

For each region of the acquired image corresponding to a region of the merged set of candidate face regions, an integral image may be calculated and variable-sized face detection may be applied to each merged region integral image to provide a set of confirmed face regions and a set of rejected face regions. Rejected face regions may be checked based on alternative criteria from said fixed and variable sized face detection. Responsive to the checking, One or more rejected face regions may be indicated as face regions, and the previously rejected face regions may be added to the set of confirmed face regions. The checking may include applying a skin prototype to a rejected face region.

The merging may involve merging a set of candidate face regions for an acquired image with the set of confirmed face regions for a previously acquired image.

Regions of said acquired image corresponding to regions of the merged set of candidate face regions may include regions surrounding respective regions of the merged set of candidate face regions.

Variable sized face detection may be applied including applying cascades of Haar classifiers of varying size to each merged region integral image. Twelve or fewer sizes of cascades of Haar classifiers may be applied, e.g., 3 or 4 sizes of Haar classifiers. Each cascade may include 32 classifiers.

Applying fixed size face detection may include applying a cascade of Haar classifiers of a fixed size to the integral image.

Responsive to the acquired image being captured with a flash, regions of the acquired image may be analyzed corresponding to the tracked candidate face regions for red-eye defects. Red-eye defects may be corrected in the acquired image. Indications of red eye defects may be stored with the acquired image.

A method of detecting faces in an image stream using a digital image acquisition device is also provided. An acquired image is received from an image stream including one or more face regions. The acquired image is sub-sampled at a specified resolution to provide a sub-sampled image. One or more regions of the acquired image may be identified as candidate face regions. A corresponding integral image for a least one of the candidate face regions of the sub-sampled acquired image may be analyzed. Face detection may be applied to a portion of the integral image to provide a set of one or more candidate face regions each having a given size and a respective location. For at least one candidate face region associated with a previous image, the contrast of the luminance characteristics of the corresponding region of the acquired image is enhanced.

The identifying may be performed on the sub-sampled image, and/or face detection may be performed with relaxed face detection parameters. The enhancing may be performed on the sub-sampled image and/or during calculation of the integral image. In a face detection mode of a digital image acquisition device, each new acquired image may be acquired with progressively increased exposure parameters until at least one candidate face region is detected.

An image processing apparatus includes one or more processors and one or more digital storage media having digitally-encoded instructions embedded therein for programming the one or more processors to perform any of the methods described herein for detecting, recognizing and/or tracking faces in an image stream.

BRIEF DESCRIPTION OF THE DRAWINGS

Embodiments of the invention will now be described by way of example, with reference to the accompanying drawings, in which.

DETAILED DESCRIPTION OF THE PREFERRED EMBODIMENTS

Methods are provided for detecting, tracking or recognizing faces, or combinations thereof, within acquired digital images of an image stream. An image processing apparatus is also provided including one or more processors and one or more digital storage media having digitally-encoded instructions embedded therein for programming the one or more processors to perform any of these methods.

A first method is provided for tracking faces in an image stream with a digital image acquisition device. An acquired image is received from an image stream including one or more face regions. The acquired image is sub-sampled at a specified resolution to provide a sub-sampled image. A corresponding integral image is calculated for a least a portion of the sub-sampled image. A fixed size face detection is applied to at least a portion of the integral image to provide a set of one or more candidate face regions each having a given size and a respective location. Responsive to the given size and respective location of the candidate face regions, and optionally including one or more previously detected face regions, adjusting a resolution at which a next acquired image is sub-sampled.

In certain embodiments, calculations are avoided of a complete highest resolution integral image for every acquired image in an image stream, thereby reducing integral image calculations in an advantageous face tracking system. This either reduces processing overhead for face detection and tracking or allows longer classifier chains to be employed during the frame-to-frame processing interval to provide higher quality results, and either way providing enhanced face tracking This can significantly improve the performance and/or accuracy of real-time face detection and tracking.

In certain embodiments, when implemented in an image acquisition device during face detection, a subsampled copy of an acquired image may be extracted from the camera hardware image acquisition subsystem and the integral image may be calculated for this subsampled image. During face tracking, the integral image may be calculated for an image patch surrounding each candidate region, rather than the entire image.

In such an implementation, the process of face detection may be spread across multiple frames. This approach is advantageous for effective implementation. In one example, digital image acquisition hardware is designed to subsample to a single size. This aspect takes advantage of the fact that when composing a picture, a face will typically be present for multiple frames within video sequences. Significant improvements in efficiency are provided, while the reduction in computation does not impact very significantly on the initial detection of faces.

In certain embodiments, the 3-4 smallest sizes (lowest resolution) of subsampled images are used in cycle. In some cases, such as when the focus of the camera is set to infinity, larger image subsamples may be included in the cycle as smaller (distant) faces may occur within the acquired image(s). In yet another embodiment, the number of sub-sampled images may change based on the estimated potential face sizes based on the estimated distance to the subject. Such distance may be estimated based on the focal length and focus distance, these acquisition parameters may be available from other subsystems within the imaging appliance firmware.

By varying the resolution/scale of the sub-sampled image which is in turn used to produce the integral image, a single fixed size of classifier can be applied to the different sizes of integral image. Such an approach is particularly amenable to hardware embodiments where the subsampled image memory space can be scanned by a fixed size direct memory access (DMA) window and digital logic to implement a Haar-feature classifier chain can be applied to this DMA window. However, it will be seen that several sizes of classifier (in a software embodiment), or multiple fixed-size classifiers (in a hardware embodiment) could also be used.

A key advantage of this aspect is that from frame to frame the calculation involves a low resolution integral image.

A full resolution image patch surrounding each candidate face region may be acquired prior to the acquisition of the next image frame. An integral image may then be calculated for each such image patch and a multi-scaled face detector may be applied to each such image patch. Regions which are found by the multi-scaled face detector to be face regions are referred to as confirmed face regions.

This aspect advantageously avoids involvement of motion and audio queues as described in Rui and allows significantly more robust face detection and tracking to be achieved in a digital camera.

In accordance with certain embodiments, a face detection and recognition method is also provided. In these embodiments, an acquired image is received from an image stream including one or more face regions. The acquired image is sub-sampled at a specified resolution to provide a first-sub-sampled image. An integral image is calculated for at least a portion of the sub-sampled image. Face detection is applied to at least a portion of the integral image to provide a set of one or more candidate face regions each including a given size and a respective location. Using a database, face recognition is selectively applied to one or more candidate face regions to provide an identifier for a recognized face. The identifier is stored for the recognized face in association with at least one image from the image stream.

In certain embodiments, when face tracking detects a face region from a stream of images, the acquisition device firmware runs a face recognition algorithm at the location of the face using a database preferably stored on the acquisition device comprising personal identifiers and their associated face parameters.

This feature mitigates problems of algorithms that use a single image for face detection and recognition which have lower probability of performing correctly.

In certain embodiments, an orientation of a digital image acquisition device is determined for at least one acquired image of an image stream. Face detection is applied to at least a portion of the acquired image to provide a set of one or more candidate face regions according to the determined orientation, and each candidate face region has a given size and a respective location.

In certain embodiments, the acquisition device includes an orientation sensor which indicates the likely orientation of faces in acquired images. The determined camera orientation is fed to face detection processes which then apply face detection for the likely orientation of faces. This improves processing requirements and/or face detection accuracy.

A method is also provided for tracking faces in an image stream using a digital image acquisition device. An acquired image may be received from an image stream including one or more face regions. An indication of relative movement of the acquired image relative to a previously acquired image is also received. The previously acquired image includes an associated set of candidate face regions having a given size and a respective location. Adjusted face detection is applied to at least a portion of the acquired image in the vicinity of the candidate face regions as a function of the movement to provide an updated set of candidate face regions.

A face tracking module in accordance with this feature improves performance, as it employs a motion sensor subsystem to indicate to the face tracking module large motions of the acquisition device during a face tracking sequence.

Without such an advantageous sensor, where the acquisition device is suddenly moved by a user rather than slowly panned across a scene, candidate face regions in the subsequent frames of a video sequence may be displaced beyond the immediate vicinity of the corresponding candidate region in the previous video frame, causing the face tracking module to fail to track the face such that the process then involves re-detection of the candidate.

In certain embodiments, a method and apparatus are provided for detecting faces in an image stream using a digital image acquisition device. In these embodiments, an acquired image is received from an image stream including one or more face regions. An acquired image is sub-sampled at a specified resolution to provide a sub-sampled image. One or more regions of said acquired image are identified that predominantly include skin tones. A corresponding integral image is calculated for a least one of the skin tone regions of the sub-sampled acquired image. Face detection is applied to at least a portion of the integral image to provide a set of one or more candidate face regions each having a given size and a respective location.

By only running the face detector on regions predominantly including skin tones, more relaxed face detection can be used, as there is a higher chance that these skin-tone regions do in fact contain a face. So, faster face detection can be employed to more effectively provide similar quality results to running face detection over the whole image with stricter face detection involved in positively detecting a face.

Figure 1:
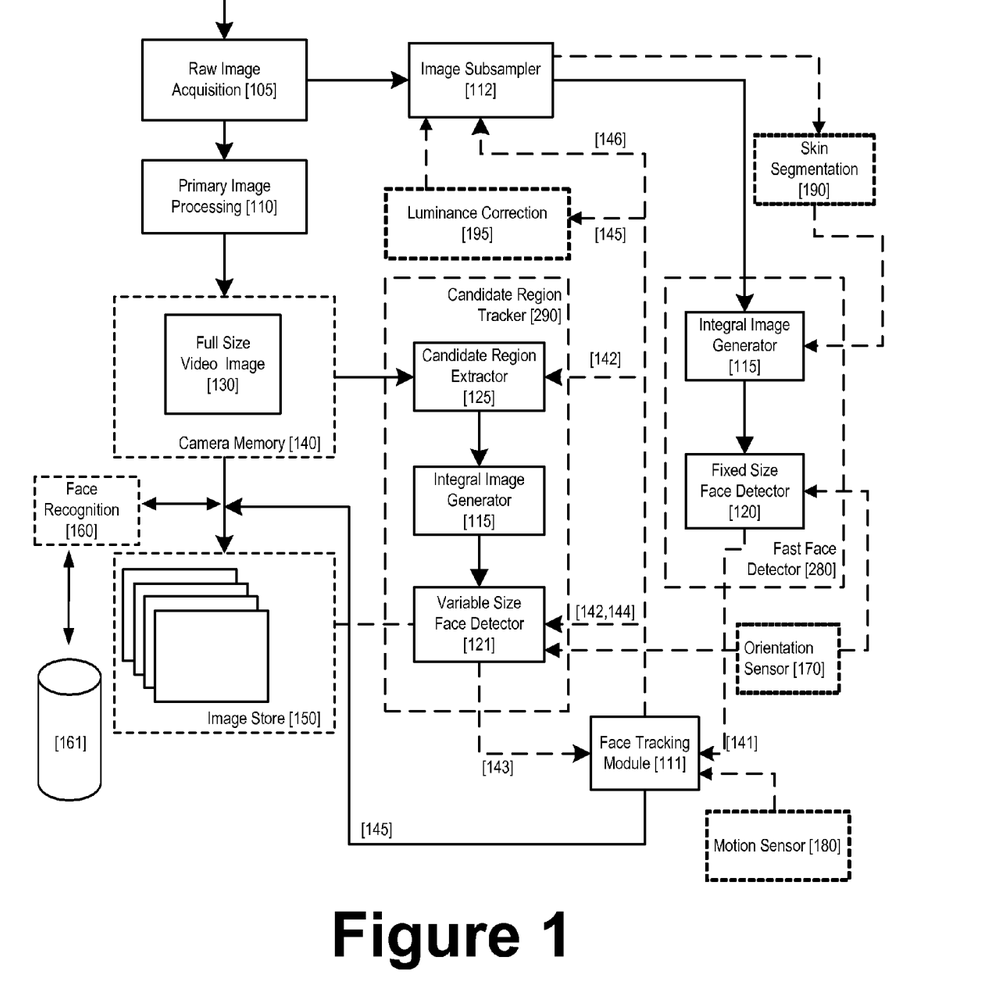
FIG. 1 is a block diagram illustrating principle components of an image processing apparatus in accordance with certain embodiments.

FIG. 1 shows the primary subsystems of a face tracking system in accordance with certain embodiments. The solid lines indicate the flow of image data; the dashed line indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera, or a combination thereof.

A digital image is acquired in raw format from an image sensor (CCD or CMOS) [105] and an image subsampler [112] generates a smaller copy of the main image. Most digital cameras already contain dedicated hardware subsystems to perform image subsampling, for example to provide preview images to a camera display. Typically, the subsampled image is provided in bitmap format (RGB or YCC). In the meantime, the normal image acquisition chain performs post-processing on the raw image [110] which typically includes some luminance and color balancing. In certain digital imaging systems the subsampling may occur after such post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing involved in the face detection is proportionately reduced. If the subsampled image is ¼ of the main image, e.g., has ¼ the number of pixels and/or ¼ the size, then the processing time involved is only about 25% of that for the full image.

This approach is particularly amenable to hardware embodiments where the subsampled image memory space can be scanned by a fixed size DMA window and digital logic to implement a Haar-feature classifier chain can be applied to this DMA window. Several sizes of classifiers may alternatively be used (in a software embodiment), or multiple fixed-size classifiers may be used (in a hardware embodiment). An advantage is that a smaller integral image is calculated.

After application of the fast face detector [280] any newly detected candidate face regions are passed onto a face tracking module [111] where any face regions confirmed from previous analysis [145] may be merged with new candidate face regions prior to being provided to a face tracker [290].

The face tracker [290] provides a set of confirmed candidate regions [143] back to the tracking module [111]. Additional image processing filters are preferably applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in a next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable sized detector [112], as one possible example a VJ detector, which then applies a classifier chain, preferably at least a 32 classifier chain, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] is applied at this particular scale and/or perhaps at one scale higher (i.e. 1.25 time larger) and one scale lower (i.e. 1.25 times lower).

As an example of the latter, if the focus of the image acquisition system has moved to approximately infinity, then the smallest scalings will be applied in the face detector [121]. Normally these scalings would not be employed as they would be applied a greater number of times to the candidate face region in order to cover it completely. It is worthwhile noting that the candidate face region will have a minimum size beyond which it should not decrease—this is in order to allow for localized movement of the camera by a user between frames. In some image acquisition systems which contain motion sensors, such localized movements may be tracked. This information may be employed to further improve the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected, and these can be explicitly returned by the tracker [290] or can be calculated by the tracking module [111] by analyzing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled, and so provided to the detector [280], and also to provide the resolution [146] at which the next acquired image is to be sub-sampled.

Where the detector [280] does not run when the next image is acquired, the candidate regions [142] provided to the extractor [125] for the next acquired image will be the regions [145] confirmed by the tracking module [111] from the last acquired image. On the other hand, when the face detector [280] provides a new set of candidate regions [141] to the face tracking module [111], these candidate regions are preferably merged with the previous set of confirmed regions [145] to provide the set of candidate regions [142] to the extractor [125] for the next acquired image.

Zoom information may be obtained from camera firmware. Using software techniques which analyze images in camera memory 140 or image store 150, the degree of pan or tilt of the camera may be determined from one image to another.

In one embodiment, the acquisition device is provided with a motion sensor 180, as illustrated at FIG. 1, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 180 could equally be implemented with MEMS sensors of the sort which will be incorporated in next generation consumer cameras and camera-phones.

In any case, when the camera is operable in face tracking mode, i.e. constant video acquisition as distinct from acquiring a main image, shake compensation would typically not be used because image quality is lower. This provides the opportunity to configure the motion sensor 180 to sense large movements by setting the motion sensor amplifier module to low gain. The size and direction of movement detected by the sensor 180 is preferably provided to the face tracker 111. The approximate size of faces being tracked is already known, and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the locations of candidate regions as a function of the direction and size of the movement. Alternatively, the size of the region over which the tracking algorithms are applied may also be enlarged (and the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105, 110 for full-sized images to employ normal shake compensation algorithms based on information from the motion sensor 180.

An alternative way of limiting the areas of an image to which the face detector 120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 190 is preferably applied to a sub-sampled version of the acquired image. If the resolution of the sub-sampled version is not sufficient, then a previous image stored in image store 150 or a next sub-sampled image can be used as long as the two images are not too different in content from the current acquired image. Alternatively, skin segmentation 190 can be applied to the full size video image 130.

In any case, regions containing skin tones are identified by bounding rectangles and these bounding rectangles are provided to the integral image generator 115 which produces integral image patches corresponding to the rectangles in a manner similar to the tracker integral image generator 115.

Not alone does this approach reduce the processing overhead associated with producing the integral image and running face detection, but in the present embodiment, it also allows the face detector 120 to apply more relaxed face detection to the bounding rectangles, as there is a higher chance that these skin-tone regions do in fact contain a face. So for a VJ detector 120, a shorter classifier chain can be employed to more effectively provide similar quality results to running face detection over the whole image with longer VJ classifiers required to positively detect a face.

Further improvements to face detection are also contemplated in other embodiments. For example, based on the fact that face detection can be very dependent on illumination conditions, such that small variations in illumination can cause face detection to fail and cause somewhat unstable detection behavior, in another embodiment, confirmed face regions 145 are used to identify regions of a subsequently acquired sub-sampled image on which luminance correction may be performed to bring regions of interest of the image to be analyzed to the desired parameters. One example of such correction is to improve the luminance contrast within the regions of the sub-sampled image defined by confirmed face regions 145.

Contrast enhancement may be used to increase local contrast of an image, especially when the usable data of the image is represented by close contrast values. Through this adjustment, intensities of pixels of a region when represented on a histogram which would otherwise be closely distributed can be better distributed. This allows for areas of lower local contrast to gain a higher contrast without affecting global contrast. Histogram equalization accomplishes this by effectively spreading out the most frequent intensity values.

The method is useful in images with backgrounds and foregrounds that are both bright or both dark. In particular, the method can lead to better detail in photographs that are over-exposed or under-exposed.

Alternatively, this luminance correction can be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face.

Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 170, as illustrated at FIG. 1. This can include a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150 for quickly determining whether images are being acquired in portrait or landscape mode and whether the camera is tilted clockwise or anti-clockwise.

Once this determination is made, the camera orientation can be fed to one or both of the face detectors 120, 121. The detectors may apply face detection according to the likely orientation of faces in an image acquired with the determined camera orientation. This feature can either significantly reduce the face detection processing overhead, for example, by avoiding the employment of classifiers which are unlikely to detect faces or increase its accuracy by running classifiers more likely to detects faces in a given orientation more often.

Figure 2:
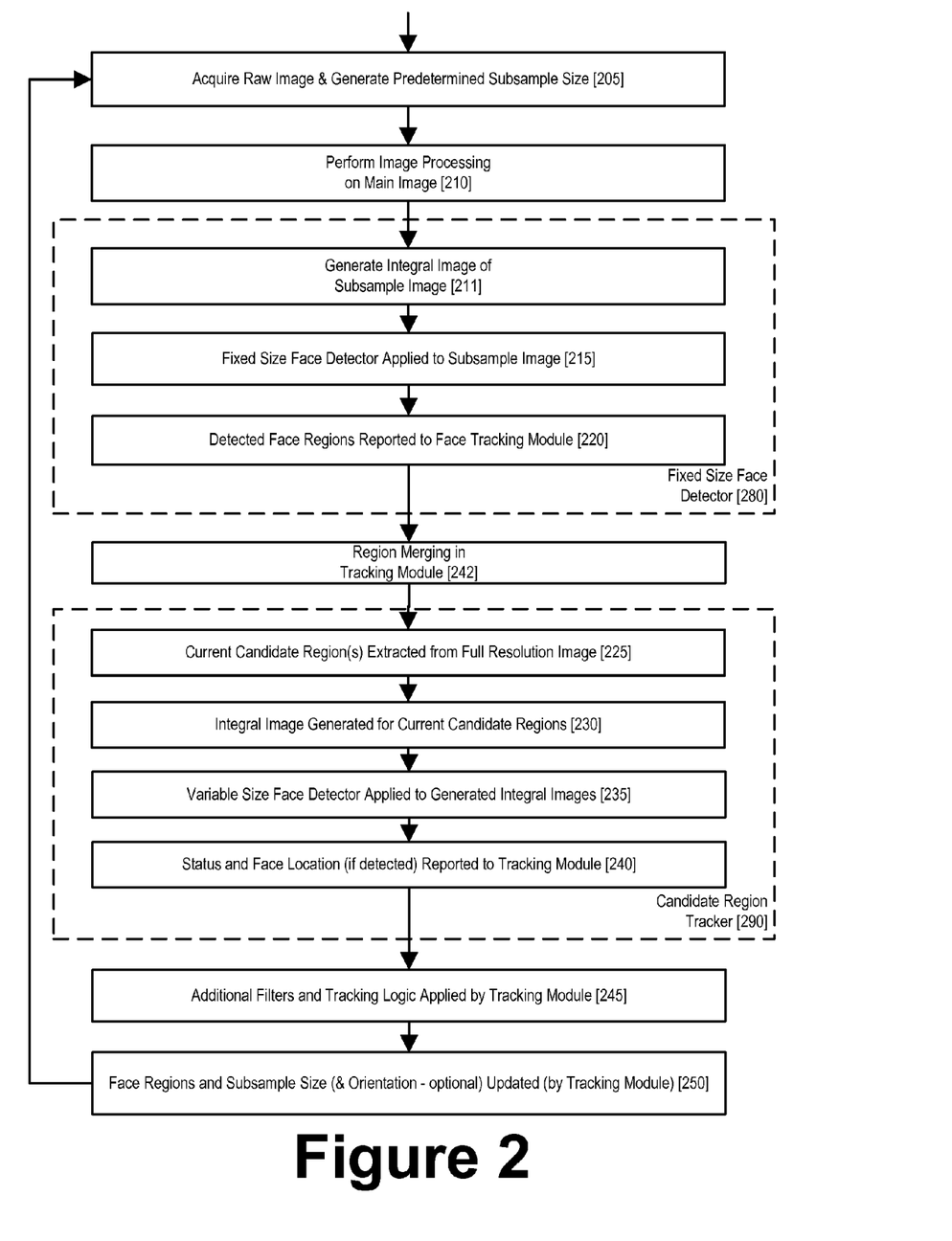
FIG. 2 is a flow diagram illustrating operation of the image processing apparatus of FIG. 1.

FIG. 2 illustrates a main workflow in accordance with certain embodiments. The illustrated process is split into (i) a detection/initialization phase which finds new candidate face regions [141] using a fast face detector [280] which operates on a sub-sampled version of the full image; (ii) a secondary face detection process [290] which operates on extracted image patches for candidate regions [142], which are determined based on locations of faces in one or more previously acquired image frames, and (iii) a main tracking process which computes and stores a statistical history of confirmed face regions [143]. Although the application of the fast face detector [280] is shown occurring prior to the application of the candidate region tracker [290] in FIG. 2, the order is not critical and the fast detection is not necessarily executed on every frame or in certain circumstances may be spread across multiple frames.

Thus, in step 205 the main image is acquired and in step 210 primary image processing of that main image is performed as described in relation to FIG. 1. The sub-sampled image is generated by the sub-sampler [112] and an integral image is generated therefrom by the generator [115] at step 211. The integral image is passed to the fixed size face detector [120] and the fixed size window provides a set of candidate face regions [141] within the integral image to the face tracking module step 220. The size of these regions is determined by the sub-sampling scale [146] specified by the face tracking module to the sub-sampler and this scale is preferably based on an analysis of previous sub-sampled/integral images by the detector [280] and patches from previous acquired images by the tracker [290] as well perhaps as other inputs such as camera focus and movement.

The set of candidate regions [141] is merged with the existing set of confirmed regions [145] to produce a merged set of candidate regions [142] to be provided for confirmation at step 242.

For the candidate regions [142] specified by the face tracking module 111, the candidate region extractor [125] extracts the corresponding full resolution patches from an acquired image at step 225. An integral image is generated for each extracted patch at step 230 and a variable-size face detection is applied by the face detector 121 to each such integral image patch, for example, a full Viola-Jones analysis. These results [143] are in turn fed back to the face-tracking module [111] at step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280] at step 245. For example, if a face region had been tracked over a sequence of acquired images and then lost, a skin prototype could be applied to the region by the module [111] to check if a subject facing the camera had just turned away. If so, this candidate region may be maintained for checking in a next acquired image whether the subject turns back to face the camera.

Depending on the sizes of the confirmed regions being maintained at any given time and the history of their sizes, e.g. are they getting bigger or smaller, the module 111 determines the scale [146] for sub-sampling the next acquired image to be analyzed by the detector [280] and provides this to the sub-sampler [112] step 250.

The fast face detector [280] need not run on every acquired image. So, for example, where only a single source of sub-sampled images is available, if a camera acquires 60 frames per second, 15-25 sub-sampled frames per second (fps) may be required to be provided to the camera display for user previewing. Clearly, these images need to be sub-sampled at the same scale and at a high enough resolution for the display. Some or all of the remaining 35-45 fps can be sampled at the scale required by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment, the sample rate may decrease.

Alternatively, the decision on the next sample may also be performed based on processing of the content of selected images. If there is no significant change in the image stream, the full face tracking process might not be performed. In such cases, although the sampling rate may be constant, the images will undergo a simple image comparison and only if it is decided that there is justifiable differences, will the face tracking algorithms be launched.

The face detector [280] also need not run at regular intervals. So for example, if the camera focus is changed significantly, then the face detector may be run more frequently and particularly with differing scales of sub-sampled images to try to detect faces which should be changing in size. Alternatively, where focus is changing rapidly, the detector [280] could be skipped for intervening frames, until focus has stabilized. However, it is generally when focus goes to approximately infinity that the highest resolution integral image is to be produced by the generator [115].

In this latter case, the detector may not be able to cover the entire area of the acquired, subsampled, image in a single frame. Accordingly the detector may be applied across only a portion of the acquired, subsampled, image on a first frame, and across the remaining portion(s) of the image on one or more subsequent acquired image frames. In a one embodiment, the detector is applied to the outer regions of the acquired image on a first acquired image frame in order to catch small faces entering the image from its periphery, and on subsequent frames to more central regions of the image.

In a separate embodiment, the face detector 120 will be applied only to the regions that are substantively different between images. Note that prior to comparing two sampled images for change in content, a stage of registration between the images may be needed to remove the variability of changes in camera, caused by camera movement such as zoom, pan and tilt.

In alternative embodiments, sub-sampled preview images for the camera display can be fed through a separate pipe than the images being fed to and supplied from the image sub-sampler [112] and so every acquired image and its sub-sampled copies can be available both to the detector [280] as well as for camera display.

In addition to periodically acquiring samples from a video stream, the process may also be applied to a single still image acquired by a digital camera. In this case, the stream for the face tracking may include a stream of preview images, and the final image in the series may be the full resolution acquired image. In such a case, the face tracking information can be verified for the final image in a similar fashion to that described in FIG. 2. In addition, information such as coordinates or mask of the face may be stored with the final image. Such data may fit as an entry in a saved image header, for example, for future post-processing, whether in the acquisition device or at a later stage by an external device.

FIG. 3 illustrates operation in accordance with certain embodiments through a worked example. FIG. 3(a) illustrates a result at the end of a detection and tracking cycle on a frame of video, with two confirmed face regions [301, 302] of different scales being shown. In this exemplary embodiment, for pragmatic reasons, each face region has a rectangular bounding box. Although it is easier to make computations on rectangular regions, different shapes can be used. This information is recorded and output as [145] by the tracking module [111] of FIG. 1.

Figure 3A:
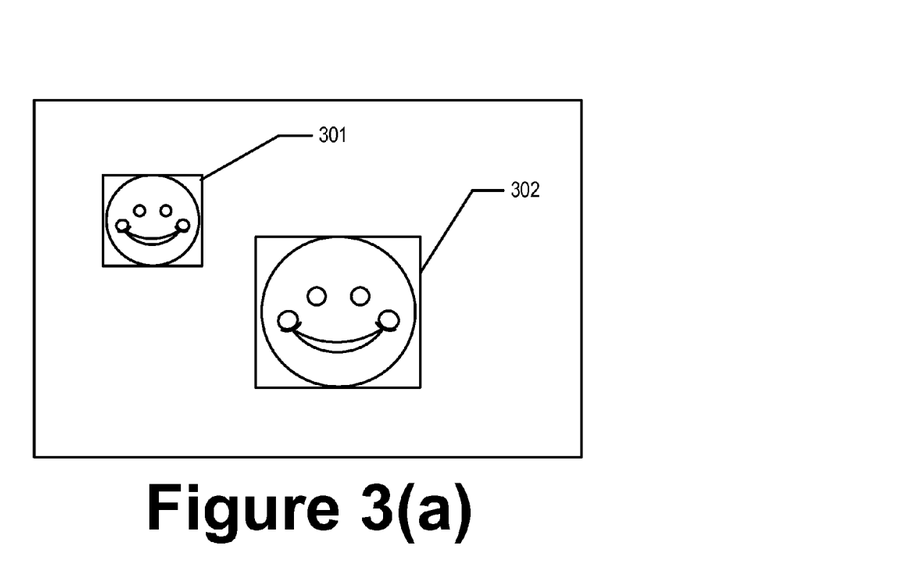
FIGS. 3(a) to 3(d) illustrate examples of images processed by an apparatus in accordance with certain embodiments.

Based on a history of the face regions [301,302], the tracking module [111] may decide to run fast face tracking with a classifier window of the size of face region [301] with an integral image being provided and analyzed accordingly.

Figure 3B:
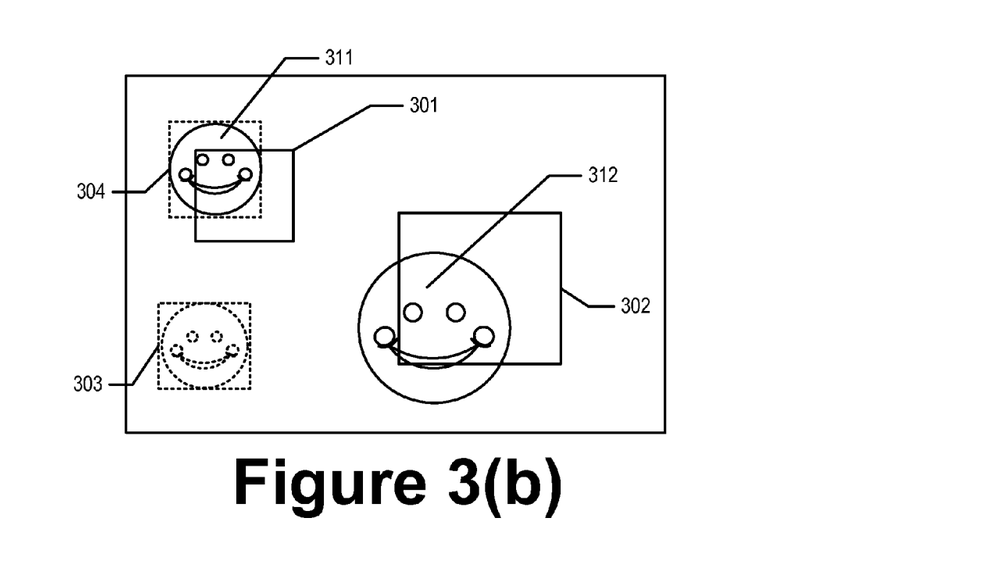
Figure 3C:
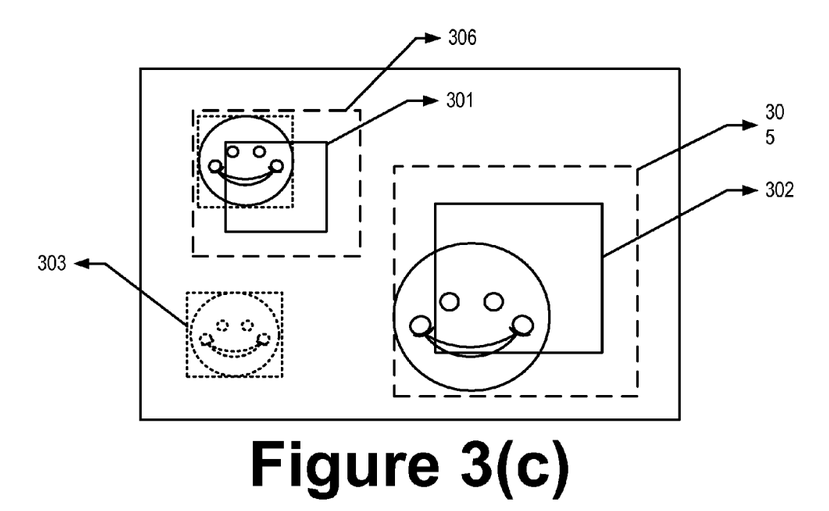

FIG. 3(b) shows the situation after the next frame in a video sequence is captured and the fast face detector has been applied to the new image. Both faces have moved [311, 312] and are shown relative to previous face regions [301, 302]. A third face region [303] has appeared and has been detected by the fast face detector [303]. In addition, a fast face detector has found the smaller of the two previously confirmed faces [304], because it is at the correct scale for the fast face detector. Regions [303] and [304] are supplied as candidate regions [141] to the tracking module [111]. The tracking module merges this new candidate region information [141], with the previous confirmed region information [145] comprising regions [301] [302] to provide a set of candidate regions comprising regions [303], [304] and [302] to the candidate region extractor [290]. The tracking module [111] knows that the region [302] has not been picked up by the detector [280]. This may be because the face has either disappeared, remains at a size that was too large or small to be detected by the detector [280] or has changed size to a size that the detector [280] was unable to detect. Thus, for this region, the module [111] will preferably specify a large patch [305]. Referring to FIG. 3(c), this patch [305] is around the region [302] to be checked by the tracker [290]. Only the region [303] bounding the newly detected face candidate will preferably be checked by the tracker [290], whereas because the face [301] is moving, a relatively large patch [306] surrounding this region is specified to the tracker [290].

FIG. 3(c) shows the situation after the candidate region extractor operates upon the image. Candidate regions [306, 305] around both of the confirmed face regions [301, 302] from the previous video frame as well as new regions [303] are extracted from the full resolution image [130]. The size of these candidate regions has been calculated by the face tracking module [111] based partly on statistical information relating to the history of the current face candidate and partly on external metadata determined from other subsystems within the image acquisition system. These extracted candidate regions are now passed on to the variable sized face detector [121] which applies a VJ face detector to the candidate region over a range of scales. The locations of any confirmed face regions are then passed back to the face tracking module [111].

Figure 3D:
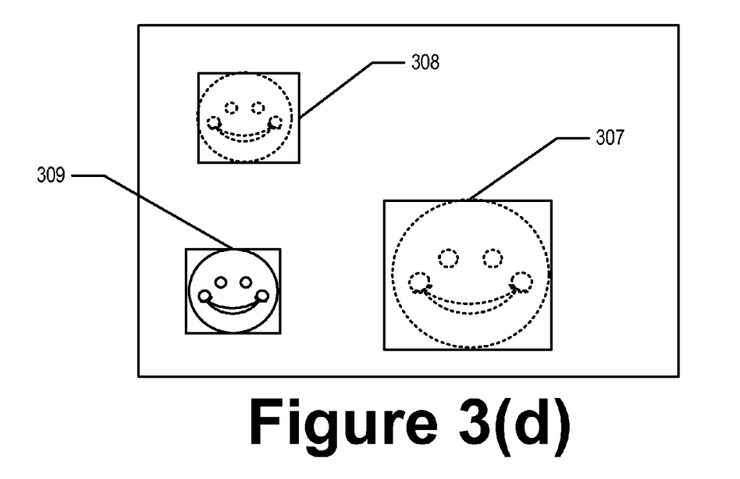

FIG. 3(d) shows the situation after the face tracking module [111] has merged the results from both the fast face detector [280] and the face tracker [290] and applied various confirmation filters to the confirmed face regions. Three confirmed face regions have been detected [307, 308, 309] within the patches [305,306,303] shown in FIG. 3(d). The largest region [307] was known, but had moved from the previous video frame, and relevant data is added to the history of that face region. Another previously known region [308] which had moved was also detected by the fast face detector which serves as a double-confirmation, and these data are added to its history. Finally a new face region [303] was detected and confirmed and a new face region history is then initiated for this newly detected face. These three face regions are used to provide a set of confirmed face regions [145] for the next cycle.

It will be seen that there are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focusing, by ensuring that focus is set on a detected face or indeed to adjust other capture settings for the optimal representation of the face in an image.

The corrections may be done as part of pre-processing adjustments. The location of the face tracking may also be used for post processing, and in particular selective post processing, where regions with faces may be enhanced. Such examples include sharpening, enhancing, saturating, brightening or increasing local contrast, or combinations thereof. Preprocessing using the locations of faces may also be used on regions without a face to reduce their visual importance, for example, through selective blurring, desaturating, or darkening.

Where several face regions are being tracked, then the longest lived or largest face can be used for focusing and can be highlighted as such. Also, the regions [145] can be used to limit areas on which, for example, red-eye processing is performed (see, e.g., U.S. published patent applications numbers 2004/0223063, 2005/0031224, 2005/0140801, and 2004/0041121, and U.S. Pat. Nos. 6,407,777 and 7,042,505, which are hereby incorporated by reference).

Other post-processing which can be used in conjunction with light-weight face detection is face recognition. In particular, such an approach can be useful when combined with more robust face detection and recognition either running on the same device or an off-line device that has sufficient resources to run more resource-consuming algorithms In this case, the face tracking module [111] reports the locations of confirmed face regions [145] to the in-camera firmware, preferably together with a confidence factor.

When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. The identifier of the person, and the last known location of the face, and optionally the recognized face region from the preview image is stored either in the image (in a header) or in a separate file stored on the camera storage [150]. This storing of the person's ID can occur even when a recognition module [160] fails for the immediately previous number of frames, but for which a face region was still detected and tracked by the module [111]. As such, the system not only provides face recognition for an image for which a subject's face may be obscured in a main acquired image, but also a good version of the subject's face which could be useful in further processing. Examples of such further processing include not only using these stored face candidate region crops for obtaining a better face recognition analysis, but also using the crops in image browsing and classification. For example, images may be browsed using thumbnails and the EXIF metadata specification allows for thumbnails of an image to be incorporated into the image header of a JPEG image to speed up creation of image thumbnails. Where face regions are also stored in the image header, it is also possible to browse images based on the faces in those images. In one embodiment, a thumbnail for each image includes a cluster of the faces which appear in that image. Each face candidate could be assigned a fraction of the space normally occupied by a single thumbnail so that multiple faces, e.g., up to 4, 6, 8 or more faces, could be displayed per image thumbnail. Another way of displaying thumbnails is to show the faces in turn, e.g., with a time interval similar to an animated gif.

In another implementation, each image is displayed with a row of face regions it contains immediately above or below the image. A switch allows the user to select between showing or hiding the main images and/or the row of included face candidates for each image. Thus, a user may quickly browse and determine a set of images which contain a particular person, or group of people.

This user interface approach also enables much faster image annotation and grouping of images associated with certain people, or groups of people, than conventional approaches to image annotation. For example, a user may select a "known person" and quickly run through several hundred images, selecting images associated with that person by scanning through the set of face regions displayed with each main image. Even where a person is in the background in a main image or where the face region in the main image is not clear, the saved face candidate regions will be larger and of good frontal pose and illumination thus being easily identified by the user.

It is appreciated that face recognition is relatively processor intensive and ideally such processing is only run where there is a high chance of success. In some implementations, a measure of the confidence factor for a candidate face region comprises a determination as to whether a face region has a pose which is substantially in a frontal alignment before face recognition is performed.

In one embodiment this alignment employs an eye detector and a mouth detector. If both eyes are correctly detected and are located in a symmetric position in relation to the left-hand and right-hand edges of the face candidate region then the face may be determined to be frontally aligned along the vertical axis. It the mouth region is also detected and is located at a distance within a certain percentage range of the lower edge of the face candiate region, then frontal alignment along the horizontal axis may also be confirmed and the face candidate is determined to be frontally aligned.

In an alternative embodiment, a first threshold of confidence indicates that there is a very high likelihood that a region is in fact a face. A second (higher score) threshold indicates a high confidence that the face is also frontally aligned. Thus, the confidence score of a face candidate region derived from the classifier cascade may be determined to be above a second threshold indicating that the face region is frontally aligned.

In another embodiment an Active Appearance Face Model such as is disclosed in "Fast and Reliable Active Appearance Model Search for 3-D Face Tracking", F Dornaika and J Ahlberg, IEEE Transactions on Systems, Man, and Cybernetics-Part B: Cybernetics, Vol 34, No. 4, pg 1838-1853, August 2004, or the original paper by T F Cootes et al "Active Appearance Models" Proc. European Conf. Computer Vision, 1998, pp 484-498, is applied to the face candidate region and converges on the true shape of the face region. Parameters of the converged AAM model indicate horizontal and vertical rotation of the face and where these are within a certain range of rotation, e.g., +/−10 degrees rotation, the face is determined to be frontally aligned.

In another embodiment, various chain classifiers for various rotations of the face are employed. The best face (frontal position) is saved when the frontal classifier chain is chosen for detection. Alternatively (if no frontal classifier chain yelds detection), the closest classifier chain to frontal detection is chosen and an indication of the angle at which this classifier chain has been trained for is provided. A further normalization stage (in preparation for face recognition) can then "rotate" the face.

An additional subsystem may be included in the camera which is operable on face candidate regions to detect luminance attributes of these regions. This calculates the average luminance and the variance of luminance across a face candidate region and evaluates if these lie within an acceptable range of values. If so, then the face candidate region is determined to be correctly illuminated and may be used for face recognition purposes.

Using the above techniques, it will be seen that only high quality face candidate regions are sent for recognition and the success rate of the face recognizer is greatly improved.

When the image is copied from camera storage to a display or permanent storage device such as a PC (not shown), persons' ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161].

When multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This allows reliable identification of persons in the image.

This feature of a system in accordance with certain embodiments solves a problem with algorithms that use a single image for face detection and recognition and may have lower probability of performing correctly. In one example, for recognition, if a face is not aligned within certain strict limits it becomes very difficult to accurately recognize a person. This method uses a series of preview frames for this purpose as it can be expected that a reliable face recognition can be done when many more variations of slightly different samples are available.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections themselves, are hereby incorporated by reference into the detailed description of the preferred embodiments as disclosing alternative embodiments and components.

We claim:

1. A method of recognizing faces in an image stream with a digital image acquisition device, comprising:
    using a processor to perform the following:
        providing a database comprising an identifier and associated parameters for each of a number of one or more faces to be recognized;
        receiving a new acquired image from an image stream;
        obtaining a location of one or more tracked face regions within said image;
        configuring data of said one or more tracked face regions for accurate face recognition;
        selectively applying face recognition using said database to at least one of said one or more tracked face regions to determine a first identifier for said at least one of said one or more tracked face regions; and
        storing, transmitting or displaying a portion of said image including the recognized face in association with the first identifier, or combinations thereof 2. The method of claim 1, further comprising identifying one or more of said tracked face regions based on at least the first identifier and a second identifier determined for the same face region.

3. The method of claims 1 wherein said configuring data of said one or more tracked face regions for accurate face recognition includes configuring the data so that at least one of the one or more tracked face regions is substantially frontal in aspect, or so that the vertical or horizontal rotation, or both, of the at least one of the one or more tracked face regions lie within a predetermined range of angles, or so that the mean and variance of luminance for at least one of the one or more tracked face regions lie within predetermined ranges, or combinations thereof.

4. The method of claim 3 wherein the parameters associated with a particular identifier comprise functions of the vertical or horizontal rotation, or both, or comprise functions of the mean or variance, or both, of luminance of a tracked face region, or combinations thereof.

5. The method of claim 1, further comprising:
    calculating a corresponding integral image for at least a portion of said image; and
    applying face detection to at least a portion of said integral image to provide a set of one or more candidate face regions each having a given size and a respective location.

6. The method of claim 1, further comprising sub-sampling said acquired image at a specified resolution to provide a sub-sampled image.

7. An image acquisition and processing apparatus including a lens and an image sensor for acquiring digital images, and one or more processors and one or more digital storage media having digitally-encoded instructions embedded therein for programming the one or more processors to perform a method of recognizing faces in an image stream, the method comprising:
    providing a database comprising an identifier and associated parameters for each of a number of one or more faces to be recognized;
    receiving a new acquired image from an image stream;
    obtaining a location of one or more tracked face regions within said image;
    configuring data of said one or more tracked face regions for accurate face recognition;
    selectively applying face recognition using said database to at least one of said one or more tracked face regions to determine a first identifier for said at least one of said one or more tracked face regions; and
    storing, transmitting or displaying a portion of said image including the recognized face in association with the first identifier, or combinations thereof.

8. The apparatus of claim 7, wherein the method further comprises identifying one or more of said tracked face regions based on at least the first identifier and a second identifier determined for the same face region.

9. The apparatus of claims 7, wherein said configuring data of said one or more tracked face regions for accurate face recognition includes configuring the data so that at least one of the one or more tracked face regions is substantially frontal in aspect, or so that the vertical or horizontal rotation, or both, of the at least one of the one or more tracked face regions lie within a predetermined range of angles, or so that the mean and variance of luminance for at least one of the one or more tracked face regions lie within predetermined ranges, or combinations thereof.

10. The apparatus of claim 9, wherein the parameters associated with a particular identifier comprise functions of the vertical or horizontal rotation, or both, or comprise functions of the mean or variance, or both, of luminance of a tracked face region, or combinations thereof.

11. The apparatus of claim 7, wherein the method further comprises:
    calculating a corresponding integral image for at least a portion of said image; and
    applying face detection to at least a portion of said integral image to provide a set of one or more candidate face regions each having a given size and a respective location.

12. The apparatus of claim 7, wherein the method further comprises sub-sampling said acquired image at a specified resolution to provide a sub-sampled image.

13. One or more non-transitory, computer readable media having digitally-encoded instructions embedded therein for programming one or more processors to perform a method of recognizing faces in an image stream, the method comprising:
    providing a database comprising an identifier and associated parameters for each of a number of one or more faces to be recognized;
    receiving a new acquired image from an image stream;
    obtaining a location of one or more tracked face regions within said image;

configuring data of said one or more tracked face regions for accurate face recognition;

selectively applying face recognition using said database to at least one of said one or more tracked face regions to determine a first identifier for said at least one of said one or more tracked face regions; and storing, transmitting or displaying a portion of said image including the recognized face in association with the first identifier, or combinations thereof.

14. The one or more non-transitory, computer readable media of claim 13, wherein the method further comprises identifying one or more of said tracked face regions based on at least the first identifier and a second identifier determined for the same face region.

15. The one or more non-transitory, computer readable media of claims 13, wherein said configuring data of said one or more tracked face regions for accurate face recognition includes configuring the data so that at least one of the one or more tracked face regions is substantially frontal in aspect, or so that the vertical or horizontal rotation, or both, of the at least one of the one or more tracked face regions lie within a predetermined range of angles, or so that the mean and variance of luminance for at least one of the one or more tracked face regions lie within predetermined ranges, or combinations thereof.

16. The one or more non-transitory, computer readable media of claim 15, wherein the parameters associated with a particular identifier comprise functions of the vertical or horizontal rotation, or both, or comprise functions of the mean or variance, or both, of luminance of a tracked face region, or combinations thereof.

17. The one or more non-transitory, computer readable media of claim 13, wherein the method further comprises:

calculating a corresponding integral image for at least a portion of said image; and applying face detection to at least a portion of said integral image to provide a set of one or more candidate face regions each having a given size and a respective location.

18. The one or more non-transitory, computer readable media of claim 13, wherein the method further comprises sub-sampling said acquired image at a specified resolution to provide a sub-sampled image.

* * * * *